US012159279B2

(12) United States Patent
Tharoor et al.

(10) Patent No.: US 12,159,279 B2
(45) Date of Patent: Dec. 3, 2024

(54) MOBILE-OTP BASED AUTHORISATION OF TRANSACTIONS

(71) Applicant: Visa International Service Association, San Francisco, CA (US)

(72) Inventors: Sandeep Tharoor, Anjumoorthy (IN); Malayamkumarath Sreedharan Manikandan, Cox Town (IN)

(73) Assignee: Visa International Service Association, San Francisco, CA (US)

( * ) Notice: Subject to any disclaimer, the term of this patent is extended or adjusted under 35 U.S.C. 154(b) by 278 days.

(21) Appl. No.: 16/502,117

(22) Filed: Jul. 3, 2019

(65) Prior Publication Data

US 2021/0004793 A1    Jan. 7, 2021

(51) Int. Cl.
| | |
|---|---|
| *G06Q 20/38* | (2012.01) |
| *G06Q 20/02* | (2012.01) |
| *G06Q 20/40* | (2012.01) |
| *H04L 9/08* | (2006.01) |
| *H04L 9/32* | (2006.01) |

(52) U.S. Cl.
CPC .......... *G06Q 20/385* (2013.01); *G06Q 20/02* (2013.01); *G06Q 20/40* (2013.01); *H04L 9/0863* (2013.01); *H04L 9/321* (2013.01); *H04L 9/3228* (2013.01)

(58) Field of Classification Search
CPC .... G06Q 20/40; G06Q 20/20; G06Q 20/3674; G06Q 20/326; G06Q 20/4018; G06Q 20/425; H04H 20/26; H04H 60/45; H04H 60/65; H04L 63/0838
See application file for complete search history.

(56) References Cited

U.S. PATENT DOCUMENTS

| | | | | |
|---|---|---|---|---|
| 6,687,700 | B1 * | 2/2004 | Cornelius | G06Q 10/107 |
| 8,527,417 | B2 * | 9/2013 | Telle | G06Q 20/425 |
| | | | | 705/35 |
| 8,572,684 | B1 * | 10/2013 | Sama | H04L 63/0838 |
| | | | | 726/4 |
| 8,646,062 | B2 * | 2/2014 | Bouz | G06F 21/33 |
| | | | | 726/10 |
| 10,395,462 | B2 * | 8/2019 | Ates | G06Q 20/388 |

(Continued)

FOREIGN PATENT DOCUMENTS

| | | | | |
|---|---|---|---|---|
| CN | 106575400 A | * | 4/2017 | G06F 21/31 |
| KR | 2014117079 A | * | 10/2014 | |

*Primary Examiner* — Gregory S Cunningham, II
(74) *Attorney, Agent, or Firm* — The Webb Law Firm

(57) ABSTRACT

Embodiments of the present disclosure relate to methods and systems for authenticating and authorizing mobile-One Time Password (m-OTP) based transactions. A cardholder (101) can generate the m-OTP in an issuer mobile application (301) and enter in a checkout page for completing the transaction. Once the m-OTP is entered, a merchant system (104) generates a transaction message comprising the m-OTP and a unique identifier indicating that the transaction message comprises the m-OTP. Is submitted to a directory server (106) which sends the transaction message to an issuer system (107) for authentication and authorization. The issuer system (107) generates a response message comprising a result of authentication and authorization of the transaction message. The directory server (106) routes the response message to the merchant system (104) via the acquirer system (105).

12 Claims, 13 Drawing Sheets

(56) References Cited

U.S. PATENT DOCUMENTS

| | | | | |
|---|---|---|---|---|
| 2002/0004783 | A1* | 1/2002 | Paltenghe | G06Q 30/06 705/41 |
| 2008/0154770 | A1* | 6/2008 | Rutherford | G07F 7/1008 705/44 |
| 2010/0107229 | A1* | 4/2010 | Najafi | H04W 12/069 709/248 |
| 2011/0130120 | A1* | 6/2011 | Hoeksel | H04W 12/068 455/411 |
| 2011/0208658 | A1* | 8/2011 | Makhotin | G06Q 20/401 235/380 |
| 2011/0231315 | A1* | 9/2011 | Bandyopadhyay | G06Q 20/10 705/44 |
| 2011/0276495 | A1* | 11/2011 | Varadarajan | H04L 63/0838 705/64 |
| 2011/0321146 | A1* | 12/2011 | Vernon | G06F 21/35 726/7 |
| 2012/0018506 | A1* | 1/2012 | Hammad | G06Q 20/385 235/375 |
| 2012/0284187 | A1* | 11/2012 | Hammad | G06Q 20/32 705/44 |
| 2013/0073463 | A1 | 3/2013 | Dimmick et al. | |
| 2014/0258125 | A1 | 9/2014 | Gerber et al. | |
| 2014/0281506 | A1* | 9/2014 | Redberg | H04L 63/10 713/159 |
| 2015/0032625 | A1* | 1/2015 | Dill | H04L 9/32 705/44 |
| 2015/0032627 | A1* | 1/2015 | Dill | G06Q 20/40 705/44 |
| 2016/0034889 | A1* | 2/2016 | Downs | G06Q 20/382 705/26.41 |
| 2016/0034900 | A1* | 2/2016 | Nelsen | G06Q 20/3224 705/44 |
| 2016/0140558 | A1* | 5/2016 | Groarke | G06Q 20/405 705/44 |
| 2017/0032370 | A1* | 2/2017 | Beltramino | G06Q 20/20 |
| 2018/0007172 | A1* | 1/2018 | Wang | H04L 67/24 |
| 2018/0026715 | A1* | 1/2018 | Zhao | H04B 10/03 398/1 |
| 2018/0121925 | A1* | 5/2018 | Gaikar | H04W 4/80 |
| 2018/0268411 | A1* | 9/2018 | Voldman | G06Q 20/409 |
| 2018/0310174 | A1* | 10/2018 | Rougier | H04W 12/06 |
| 2019/0043046 | A1* | 2/2019 | Jamieson | G06Q 20/3821 |
| 2019/0114633 | A1* | 4/2019 | Gandhi | G06Q 20/385 |
| 2019/0213585 | A1* | 7/2019 | Patni | H04L 63/0838 |
| 2019/0392450 | A1* | 12/2019 | Gosset | G06Q 20/401 |
| 2020/0118121 | A1* | 4/2020 | Narang | G06Q 20/4014 |
| 2020/0314091 | A1* | 10/2020 | Master | H04L 63/0838 |
| 2021/0081923 | A1* | 3/2021 | Rafferty | G06F 21/31 |

* cited by examiner

401

Amount: xxxx
Date: xx-xx-xx

Please enter the following data:

Card holder: [          ]

Card number: [          ]

Expiration date: [   ▼   ]   [   ▼   ]

Security code: [    ]

Authentication type: [   ▼   ]
                        OTP
                        m-OTP
                        3D passcode

Amount: xxxx
Date: xx-xx-xx

Enter m-OTP: [                    ]

[ Submit ]

FIGURE 4B

| Message Type Identifier | Primary Bitmap | Secondary Bitmap | Data Elements |

FIGURE 7A

| Position | Meaning |
|---|---|
| 0XXX | ISO 8583:1987 |
| 1XXX | ISO 8583:1993 |
| 2XXX | ISO 8583:2003 |

FIGURE 7B

| Position | Meaning |
|---|---|
| X0XX | Reserved by ISO |
| X1XX | Authorisation message |
| X2XX | Financial message |
| X3XX | File action message |
| X4XX | Reversal and chargeback message |
| X5XX | Reconciliation message |
| X6XX | Administrative message |
| X7XX | Fee collection message |
| X8XX | Network management message |
| X9XX | Reserved by ISO |

FIGURE 7C

| Position | Meaning |
|---|---|
| XX0X | Request |
| XX1X | Request response |
| XX2X | Advice |
| XX3X | Advice response |
| XX4X | Notification |
| XX5X | Notification acknowledgement |
| XX6X | Instruction |
| XX7X | Instruction acknowledgement |
| XX8X | Reserved for ISO |
| XX9X | Reserved by IPO |

FIGURE 7D

| Position | Meaning |
|---|---|
| XXX0 | Acquirer |
| XXX1 | Acquirer repeat |
| XXX2 | Issuer |
| XXX3 | Issuer repeat |
| XXX4 | Other |
| XXX5 | Other repeat |

FIGURE 7E

MOBILE-OTP BASED AUTHORISATION OF TRANSACTIONS

TECHNICAL FIELD

The present disclosure relates generally to electronic transactions, and more specifically to authorizing transactions using a mobile One Time Password (mOTP).

BACKGROUND

During a payment transaction using a payment card (e.g., a credit, debit, or stored value card), it is important to verify a cardholder's ownership of an account to avoid a variety of problems, such as unauthorized use. Payer authentication is the process of verifying a cardholder's ownership of an account. Upon authenticating the cardholder, it is also important to authorize the transaction made by the cardholder.

Transactions in which a consumer payment device is presented to a merchant or accessed by a point of sale terminal are termed "card present" transactions since the payment device is in the same physical location as the merchant or terminal.

In addition to card present transactions, a consumer may also initiate a transaction in a situation in which the payment device is not in the same physical location as the merchant or terminal, and instead the relevant data is provided over a communications network to the merchant (termed a "card not present" transaction). For example, a card not present transaction involving the purchase of a product or service may be initiated by a consumer by providing payment data from a remote location to a merchant over a network such as the Internet. Transactions of this type are typically initiated using a computing device such as a personal computer or laptop computer. Card not present transactions may also be initiated or performed using a mobile payment device such as a mobile phone, in which case communication with a merchant or data processing system may occur over a cellular or wireless network. Thus, payment information for a transaction may be provided using a payment device and point of sale terminal, or may be provided to a merchant using a remotely located payment device, among other methods.

One method to authenticate a cardholder's ownership of an account during a card present transaction involves a merchant's representative taking the cardholder's card, swiping it though a payment card terminal to verify account status and credit line availability, and then checking to see that the signature on the back of the card matches the purchaser's signature. Comparison of the signatures provides authentication of account ownership. If the merchant follows specific guidelines for this type of transaction, the merchant will be guaranteed payment for the amount authorized less discount and fees.

"Card not present" transactions, on the other hand, such as those occurring online, through mobile devices, through the mail, or over the telephone, involve payments that are not guaranteed to the merchant. Online transactions include those that are conducted, for example, over the Internet. No guarantee is provided primarily because the payers are not authenticated in such non face-to-face transactions, thereby allowing many risks to accompany the "card not present" transactions. Such risks involve issues such as chargebacks of payment transactions to online merchants, fraud for both merchants and cardholders, increased exception item processing expenses for banks, and an increased perception that buying goods and services online or through mobile devices is not safe and secure, which may keep some consumers away from buying online. Other examples of risks include the unauthorized use of stolen account information to purchase goods and services online, fabrication of card account numbers to make fraudulent online purchases, and extraction of clear text account information from network traffic.

Existing techniques for authenticating a cardholder's identify for a card not present transaction, such as using a static password, One Time Passwords (OTP), or an ATM PIN, or the like, are telecom network dependent, hence transactions are often declined and/or timed out due to delay or failure in telecom network. This is especially true when transactions cannot be completed in hilly regions or places with poor network connectivity.

Thus, what is needed is a secure and efficient way to authenticate a card not present transaction that is less susceptible to delays or failures in a telecom network.

The information disclosed in this background of the disclosure section is only for enhancement of understanding of the general background of the invention and should not be taken as an acknowledgement or any form of suggestion that this information forms the prior art already known to a person skilled in the art.

SUMMARY

In one embodiment, a computer-implemented method of authorizing transactions is proposed. The method comprises receiving, by a directory server, a transaction message such as a Payment Authentication Request (PAReq) message from an acquirer system for authenticating and authorizing a transaction. The transaction message comprises a mobile-One Time Password (m-OTP). In an embodiment, the m-OTP was generated by a cardholder using an issuer mobile application configured in cardholder's device. In an embodiment, the m-OTP was input into merchant system by the cardholder. The merchant system generated the transaction message comprising the m-OTP and provided the transaction message to the acquirer system for authentication and authorization. The method further comprises sending the transaction message to issuer system for authentication and authorization. Thereafter, receiving a response message from the issuer system, the response message comprising result of authorization and authentication. The method further comprises providing the response message to the merchant system via the acquirer system.

In one embodiment, a directory server is proposed. The directory server is configured to facilitate authorizing transactions. The directory server comprises one or more processors and one or more computer-readable media communicatively coupled with the one or more processors. The one or more processors are configured to receive a transaction message comprising a mobile-One Time Password (m-OTP) from an acquirer system. In an embodiment, the m-OTP was generated by a cardholder using an issuer mobile application configured in cardholder's device. In an embodiment, the m-OTP was input into merchant system by the cardholder. The merchant system generated the transaction message comprising the m-OTP and provided the transaction message to the acquirer system for authentication and authorization. The directory server is further configured to send the transaction message to issuer system for authentication and authorization. Thereafter, the directory server is further configured to receive a response message from the issuer system, the response message comprising result of authorization and authentication. Furthermore, directory server is further configured to provide the response message to the merchant system via the acquirer system.

In another embodiment, a computer-implemented method for authorizing transactions is proposed. The method is performed by a merchant system. The method comprises receiving a mobile-One Time Password (m-OTP) as input for initiating a transaction. The m-OTP was generated by a cardholder using an issuer application configured in cardholder's device. The method further comprises generating a transaction message comprising the m-OTP and a unique identifier indicating that the transaction message comprises the m-OTP. The transaction message is differentiated from other types of transaction message that do not comprise the m-OTP. The method further comprises providing the transaction message comprising the m-OTP to an acquirer system. The acquirer system includes an authorization request in the transaction message. Further, the acquirer system sends the transaction message to a directory server which is configured to send the transaction message to an issuer system for authentication and authorization. The issuer system generates a response message based on authentication and authorization and sends to the directory server. The directory server transmits the response message to the merchant system via the acquirer system. The method further comprises receiving the response message and appropriately indicates the cardholder.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIGS. 4A and 4B illustrate exemplary merchant check-out page provisioning m-OTP, in accordance with an embodiment of the present disclosure;

FIG. 7A illustrates an exemplary table that includes the format that make up the Payer Authentication Request (PAReq) message, in accordance with an embodiment of the present disclosure;

FIGS. 7B-7E illustrate exemplary tables that includes data fields related to first, second, third and fourth position of MTI identifier, in accordance with an embodiment of the present disclosure;

Figure 1:
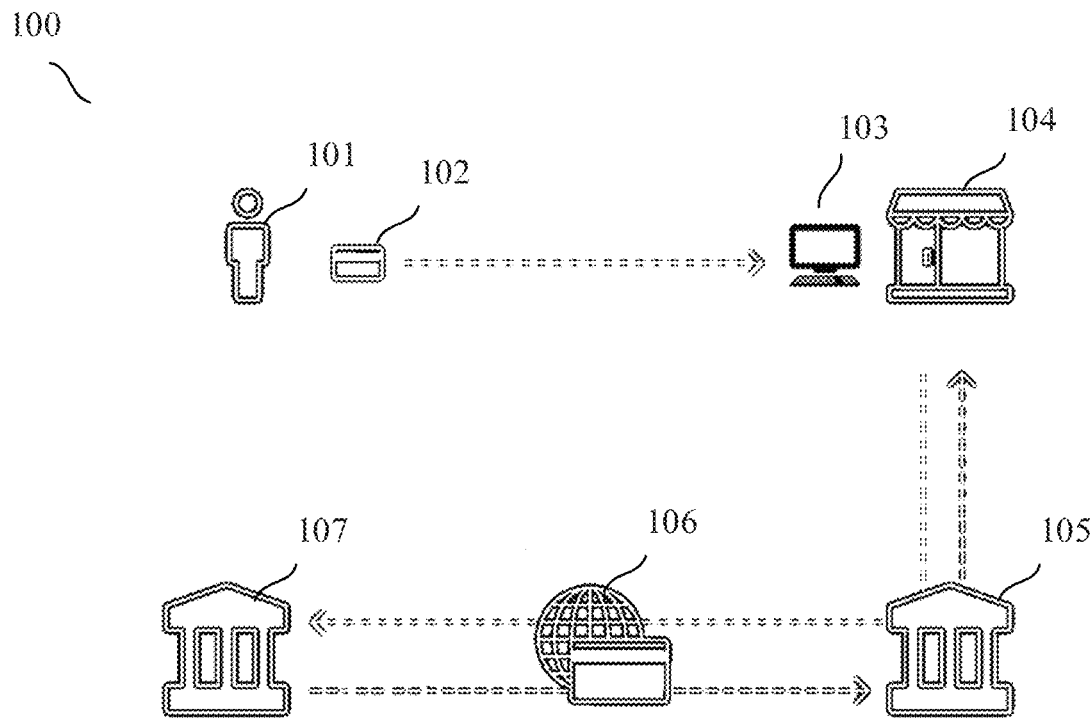
FIG. 1 illustrates an exemplary platform for performing transactions, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Generally, a transaction is complete when the cardholder is authenticated, and the transaction is authorized by an issuer system (issuer bank or trusted third-party system). Typically, two request messages are generated, e.g., a Payment Authentication Request (PAReq) message and a payment authorization request message. A merchant system generates the PAReq message and an acquirer system generates the payment authorization request message. The PAReq is processed first by the issuer system to authenticate the cardholder. During authentication, the OTP is generated by the issuer system. The OTP is generally sent to cardholder's registered mobile number and/or registered email. The cardholder then inputs the OTP in a merchant check-out page. The OTP received from the cardholder is compared with the generated OTP to authenticate the cardholder. Upon successful authentication, the payment authorization request message is generated which is again provided to the issuer system. During authorization, the transaction is validated based on many factors including account balance, security of transaction and such details. As two independent messages are generated for authentication and authorization, the time taken for completing the transaction is more. Also, processing complexity increases as two independent messages have to be processed. Furthermore, such transactions are prone to failures due to dependency on telecom network of cardholder.

Embodiments of the present disclosure relate to methods and systems for authenticating and authorizing mobile-One Time Password (m-OTP) based transactions. A cardholder can generate the m-OTP in an issuer mobile application installed in cardholder's device. The generated m-OTP is entered in a merchant checkout page available to the cardholder for completing the transaction. Once the m-OTP is entered, a merchant system generates a transaction message comprising the m-OTP and a unique identifier indicating that the transaction message comprises the m-OTP. The transaction message includes Payment Authentication Request (PAReq). An acquirer system includes a payment authorization request in the transaction message and transmits to a directory server. The directory server sends the transaction message comprising the PAReq and the payment authorization request to issuer system for authentication and authorization. The issuer system generates a Payment Authentication Response (PARes) message comprising a result of authentication and authorization of the transaction message. The directory server receives the PARes message and transmits it to the merchant system via the acquirer system.

FIG. 1 describes an overview of a platform (100) for performing transactions. The platform (100) is provided as a service to participating issuers, account holders, and merchants. An implementation of the platform (100) relating to online payment transactions is described. The description of online payment transactions covers the payment transaction, and specific message flows. The present invention pertains to online transactions having a security feature of two-factor authentication such as OTP for authenticating cardholders. The entire description is described in view of online transactions. However, the invention is not limited to online transaction, and can be applied to any type of transaction which provisions two-factor authentication such as the OTP.

The platform (100) is designed to authenticate and authorize cardholder (101) account ownership during transactions in which one party cannot physically verify the identity of another party who purports to be the owner of a specific account. For example, the platform (100) can be used in various transactions when a trusted party (commonly issuer system) (107) authenticates the identity of cardholder (101) for the benefit of a third party. As is commonly known, the trusted party usually accepts legal responsibility for the authentication of the cardholder (101) to the third party.

In an online purchase, flow of a transaction begins with the cardholder (101) entering card (102) details in a merchant checkout page provided in a computing unit (103). A merchant system (104) receives the details of the card (102) and generates a transaction message for authenticating the cardholder (101). The merchant system (104) routes the transaction message to a directory server (106) via an acquirer system (105). The directory server (106) sends the transaction message to an issuer system (107) for authenticating the cardholder (101). The issuer system (107) validates the card (102) details and maps to cardholder (101) account. Further, the issuer system (107) generates an OTP which is provided to the cardholder (101) generally on registered mobile (via SMS) and registered email (via Internet) over a telecom network. Upon receipt of the OTP, the cardholder (101) enters the OTP in the merchant checkout page. The merchant system (104) transmits the OTP to the issuer system (107) via the directory server (106) for validation. The issuer system (107) further validates the OTP and authenticates the cardholder (101). Upon successful authentication, the acquirer system (105) generates a payment authorization request message comprising information related to the transaction, for the issuer system (107) to authorize the transaction. The issuer system (107) validates the information present in the payment authorization request message and authorizes the transaction. An acknowledgement of the successful authorization is provided by the issuer system (107). The acknowledgement is provided to the cardholder (101) by the merchant system (104).

Figure 2:
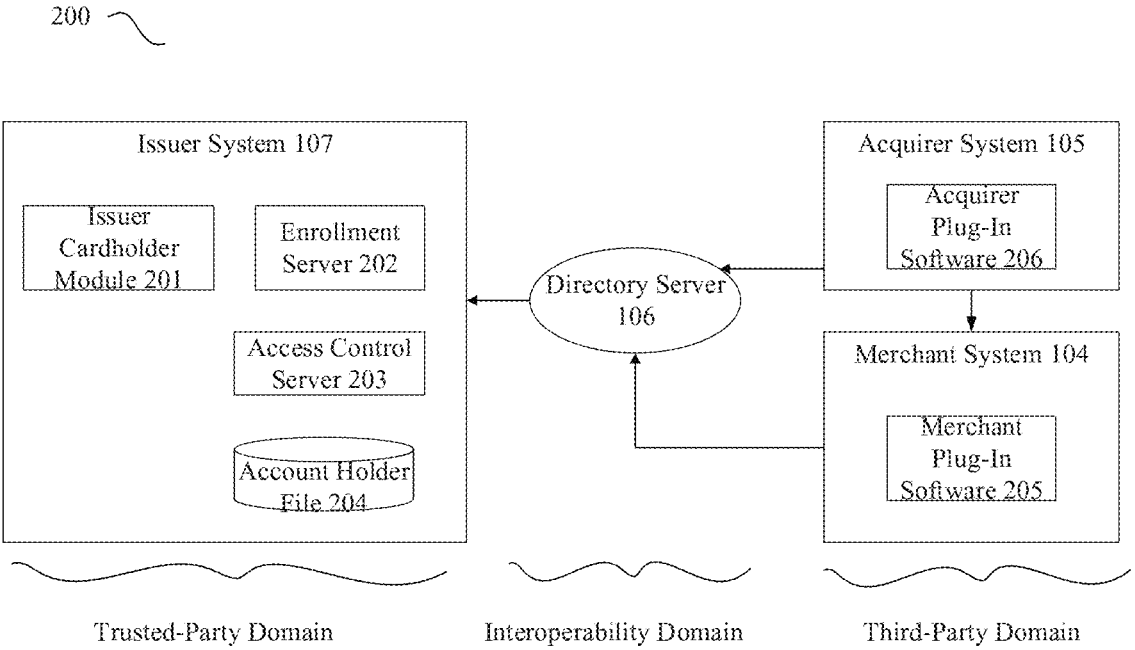
FIG. 2 illustrates an exemplary core system architecture of implementing m-OTM based authentication and authorization, in accordance with an embodiment of the present disclosure.

FIG. 2 illustrates one embodiment of a core system architecture (200) of the platform (100). The core system architecture (200) includes three domains: a trusted-party domain, an interoperability domain, and a third-party or requesting party domain. The trusted-party and the third-party domains define functional realms within which are components that are totally or at least partially controlled by the trusted or third party, respectively. The interoperability domain defines a functional realm within which are components may be utilized by the trusted-party, the third-party, as well as other parties, such as a service organization.

The trusted-party domain includes components that are primarily controlled by a trusted-party. An example of a trusted-party is a financial institution that issues payment cards to consumers, known as an issuing bank. Specifically, an issuer, or a card issuer, personalized new cards received from a card supplier and then issues these cards to its customers. Personalization may also be performed by the card supplier or by a personalization bureau. In addition to be a financial institution, an issuer may be any suitable issuing entity such as telecommunications network operator, a service association, a merchant or other organization, or even an agent acting for an issuer.

The third-party or requesting party domain includes components that are primarily controlled by a third party and/or a requesting party. A third-party can be any party who makes a request for the identity of an account holder to be authenticated. For example, a third-party can be a merchant who desires to authenticate the identity of a person alleging to be the owner of a card account. A third-party can be an acquirer who is a financial institution that enroll merchants in a payment scheme and manages the accounts of merchants. An acquirer also routes information from an online merchant to the telecommunications network. In other embodiments, a merchant can directly route information to the telecommunications network.

The interoperability domain can be supported by the Internet and includes components used by both the trusted-party and the third-party.

The trusted-party domain is also referred as an issuer system (107) hereafter in the present disclosure. The issuer system (107) includes an issuer cardholder module (201), an enrolment server (202), an Access Control Server (ACS) (203), and an account holder file (204). Additional components are included within the issuer system (107) depending upon the specific field of use in which the system will be used. For example, in a payment transaction, additional components in each of the domains are present for the purpose of authenticating cardholder (101) identifies with respect to payment transactions.

In one embodiment, the enrollment server (202) is a computer that manages a cardholder's enrollment into issuer system (107) by presenting a series of questions (for example via a web interface) to be answered by the account holder and verified by the trusted party. As shown in FIG. 2, the issuer system (107) operates the enrollment server (202). However, in an embodiment, a service organization such as Visa® can operate enrollment server (202) on behalf of the issuer system (107). The issuer system (107) can use a web-enabled, interactive "identity authentication service" provided by an outside entity during the enrollment process to help validate an account holder's identity.

In an embodiment, ACS (203) is a computer that has a database of account holders registered for the account authentication service. The ACS (203) includes account and password information for each account holder. During an account authentication transaction, the ACS (203) provides digitally signed receipts to an authentication requesting party, controls access to the issuer system (107), and validates account holder participation in the authentication service. In one or more embodiments, a card issuer or a service organization such as Visa® can operate ACS (203) for the trusted-party (also referred as acquirer system (105)). While the account authentication service does not require any additional cardholder software to be used, optional account holder software and hardware may be deployed. Additional account holder software can support additional authentication techniques such as digital certificates, integrated circuit cards (e.g., chip cards) and chip card readers.

Account holder file (204) is a trusted party managed database for storing information relating to the account holders who are successfully enrolled with the issuer system (107). Issuer cardholder module (201) is controlled by the trusted-party and includes information about account holders. Such information relates to account information, services utilized by the cardholder (101), etc. Some of the information within the issuer cardholder module (201) can be used in enrolling account holders into the issuer system (107).

The acquirer system (105) requests the authentication of an account holder. In an embodiment, the merchant system (104) manages merchant plug-in software (205) that facilitates the authentication protocol. The merchant plug-in software (205) is a software module that integrates into a merchant's (104) web site. The merchant plug-in software (205) is programmed or configured for generating the transaction message having the m-OTP. Further, the merchant plug-in software (205) may include the PAReq message in the transaction message. An acquirer plug-in software (206) manages the acquirer system (105). In an embodiment, if the merchant plug-in software (205) has not included the PAReq message in the transaction message, the acquirer plug-in software (206) receives the transaction message from the merchant plug-in software (205) and includes the PAReq message. Further, the acquirer plug-in software (206) also includes the payment authorization request message in the transaction message. Thereafter, the acquirer plug-in software (206) sends the transaction message to the interoperability domain for authentication and authorization.

In an embodiment, the interoperability domain includes the directory server (106). The directory server may be supported by the Internet, and includes components used by both the issuer system (107) and the acquirer system (105). The directory server (106) is configured to route authentication and/or authorization requests from the acquirer system (105) to specific ACS's, such as ACS (203). The directory server (106) is operated by a card scheme manager or a service organization, such as Visa. The interoperability domain can also be supported by a network other than the Internet.

In an embodiment, authentication process is useful in a scenario when the cardholder (101) shops online, adds items to a "shopping cart," proceeds to the online merchant checkout page, and completes the online merchant's checkout forms. The authentication processes can take place after the cardholder (101) decides to buy desired products or services, for example, after the cardholder (101) clicks a "buy" button. The authentication process can also begin at various other times in the cardholder (101) payment transaction. The authentication process is conducted mostly in a transparent mode to the cardholder (101) by utilizing software that has been incorporated in several points of a payment network. The directory server (106) validates participation by the cardholder (101) and the cardholder's financial institution with the authentication service. Then a window is created in which the cardholder (101) can confirm his or her identity by entering the m-OTP generated in the cardholder (101) device. In one embodiment, the m-OTP can be generated in an issuer mobile application (not shown in FIG. 2). In another embodiment, any application associated with the issuer system (107) can generate the m-OTP on behalf of the issuer financial institution. The m-OTP along with transaction details are sent to the issuer system (107) in the transaction message. As the m-OTP is not network dependent, unlike conventional systems, the PAReq message and payment authorization request message can be included in the transaction message. If the identity of the cardholder (101) is confirmed, the payment information and notice of the cardholder (101) authentication is sent back to the merchant system (104). Then, the payment transaction is processed by the merchant system (104). For example, the merchant system (104) may send an order confirmation message to the cardholder's browser.

Figure 3A:
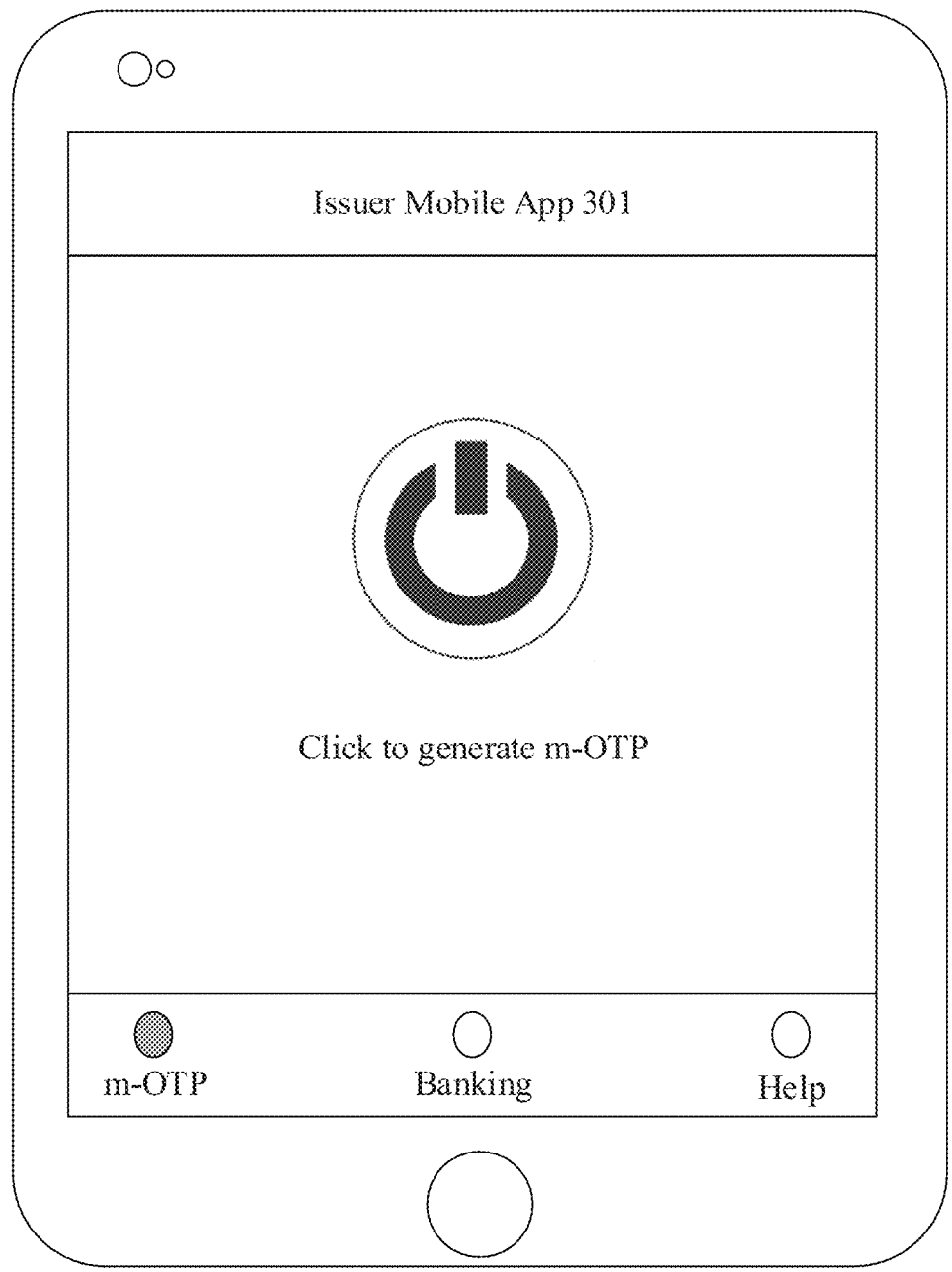
FIGS. 3A and 3B illustrate an exemplary issuer mobile application for generating m-OTP, in accordance with an embodiment of the present disclosure.
Figure 3B:
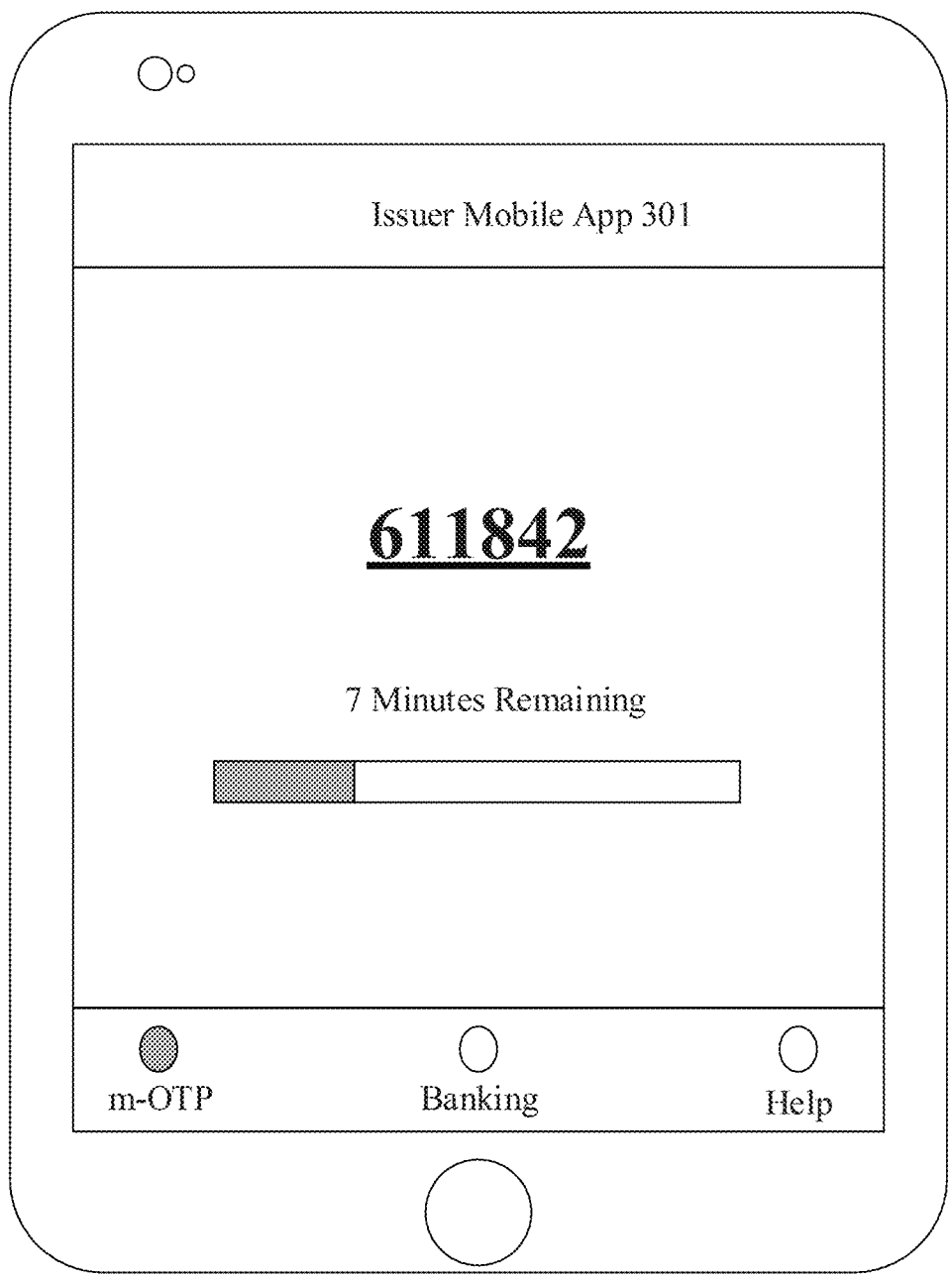

FIGS. 3A and 3B illustrate an issuer mobile application (301) for generating m-OTP. As shown issuer mobile application (301) can be an application for generating the m-OTP. In an embodiment, the issuer mobile application (301) can be a dedicated application for generating the m-OTP or can be integrated with issuer banking application and an interface may be provided for generating the m-OTP. In an embodiment, the m-OTP is a time-based (time synchronous) OTP. In some embodiments, an m-OTP may be also known as time-One Time Password (t-OTP). In an embodiment, the t-OTP uses Hash based Message Authentication Code (HMAC)-based OTP algorithm. HMAC is an algorithm which uses hashing techniques for encoding. In m-OTP, current time is hashed to generate the m-OTP. In an embodiment, the m-OTP also comprises time data. For a given instant of time, the m-OTP can be generated using unique algorithms. The m-OTP when given for authentication, the same algorithms (generated by cardholder (101)) can be used at an authentication end (in this case issuer system (107)) for generating the m-OTP based on the time data in the m-OTP generated by cardholder (101). If the both the m-OTPs (one generated by cardholder (101) and other generated by the issuer system (107)) match, then the cardholder (101) is successfully authenticated. An advantage of m-OTP compared to other OTPS is that the m-OTP can be generated offline. FIG. 3A shows a first application page where the issuer mobile application (301) may provide an option to generate the m-OTP. As shown, a button may be provided on the User Interface (UI) of the cardholder's device (103). The button can be a physical button or a touch sensitive button.

FIG. 3B shows a second application page displaying the generated m-OTP. In one embodiment, the issuer mobile application (301) may implement the HMAC-based OTP algorithm. In an embodiment, the unique algorithm implemented in the issuer mobile application (301) is implemented in the issuer system (107). When the cardholder (101) clicks the button, the issuer mobile application (301) generates the m-OTP and displays on the UI of the cardholder's device (103). In one embodiment, the m-OTP is a numeric password (e.g., "148261"). In an embodiment, the m-OTP can also be an alphanumeric password (e.g., "Pass123"). In an alternate embodiment, the m-OTP can also include special characters (e.g., "!", "@", "%" and the like). In an exemplary embodiment, the m-OTP can have 4-8 digits and/or characters. In another embodiment, the number of digits and/or characters in m-OTP can be according to standards followed by the issuer system (107). In an embodiment, the m-OTP is copied to clipboard after being generated. The copied m-OTP can be pasted in appropriate authentication forms.

FIGS. 4A and 4B illustrate merchant check-out page provisioning m-OTP, in accordance with an embodiment of the present disclosure. FIG. 4A illustrates an exemplary merchant checkout page requesting card and cardholder details. The illustration in FIGS. 4A and 4B should not be construed as a limitation. The illustration is only an example and aspects described in FIGS. 4A and 4B can be applied to any checkout page. As shown, the checkout page comprises transaction details including amount, and date. In an embodiment, the checkout page can also include merchant details and other necessary details pertaining to the transaction. In an embodiment, the merchant plug-in software (205) is associated with the checkout page. As shown in FIG. 4A, a first form (401) requests the cardholder (101) to enter details such as name of the cardholder (101), card number, expiration data, security code and authentication type. When the cardholder (101) enters the card number, the merchant plug-in software (205) can identify the interoperability service provider (such as Visa®) associated with the card. After entering the card details and details associated with the cardholder (101), the checkout page provides the option to choose authentication type. Existing checkout pages offer authentication types including OTP and static password (3D secure password). In accordance with the present disclosure, the merchant checkout page provides an additional authentication type including m-OTP. When the cardholder (101) selects the m-OTP option as authentication type, the checkout page is navigated to a second form (402) as shown in FIG. 4B.

As shown in FIG. 4B, the second form (402) receive the m-OTP. The cardholder (101) can generate the m-OTP as illustrated in FIGS. 3A and 3B. In an embodiment, the cardholder (101) can paste the m-OTP if the m-OTP was generated using the issuer mobile application (301) and the m-OTP was copied to clipboard. Alternatively, cardholder (101) can manually type the m-OTP in the field of second form (402). After entering the m-OTP by the cardholder (101), the submit button enables the submission of the m-OTP to the merchant plug-in software (205).

Figure 5:
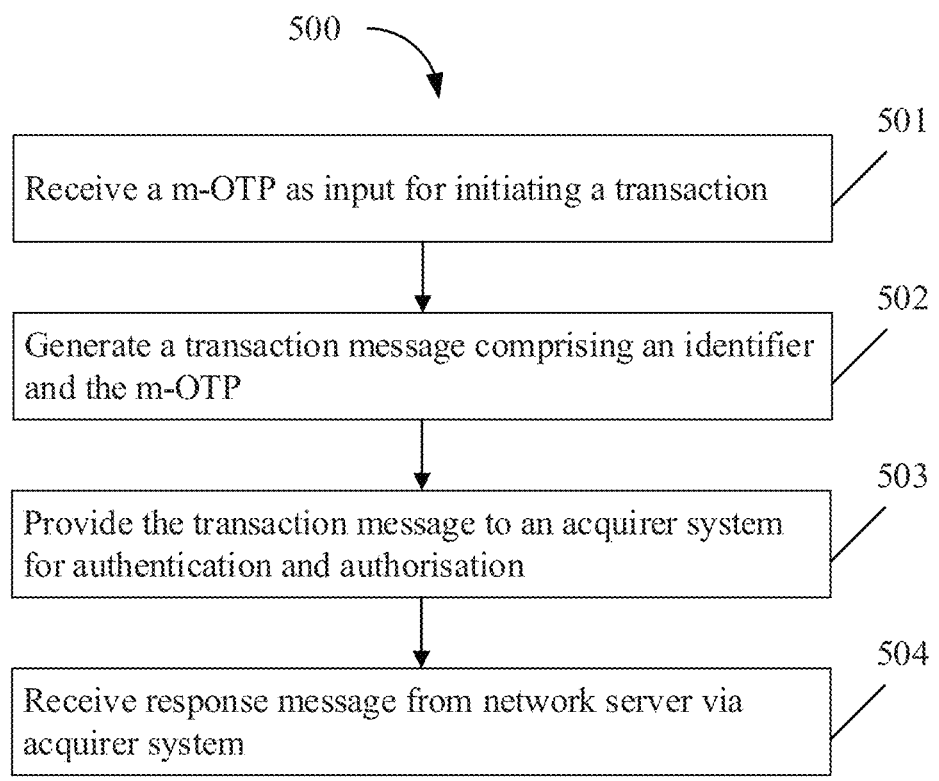
FIG. 5 is a flowchart describing m-OTP based payment authorization facilitated by merchant system, in accordance with an embodiment of the present disclosure.

The following method describes the steps performed by the merchant system (104). FIG. 5 is a flowchart describing m-OTP based payment authorization facilitated by merchant system (104), in accordance with an embodiment of the present disclosure.

As illustrated in FIG. 5, the method (500) may comprise one or more steps. The method (500) may be described in the general context of computer executable instructions. Generally, computer executable instructions can include routines, programs, objects, components, data structures, procedures, modules, and functions, which perform particular functions or implement particular abstract data types.

The order in which the method (500) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step (501), the merchant system (104) receives the m-OTP from the second form (402) of the merchant checkout page. Along with the m-OTP, the merchant system (104) also receives the card details, cardholder (101) details entered in the first form (401).

At step (502), the merchant system (104) generates the transaction message comprising the m-OTP. In an embodiment, the transaction message is generated according to ISO 8583 standards. The ISO 8583 defines transaction message structure. Reference is now made to FIG. 7A showing an example of the ISO 8583 message format. As shown in FIG. 7A, a transaction message generated according to ISO8583 may comprise a Message Type Identifier (MTI), primary bitmap, secondary bitmap and data elements. The MTI is a four-digit numeric field that describes each message class and function. There are few versions of the ISO 8583 standard, they are: ISO 8583: 1987, ISO 8583: 1993, and ISO 8583: 2003. The first digit among the four-digit represents the version of the ISO 8583. This is illustrated in FIG. 7B. As shown, when the first digit of the four-digit is 0, the version is ISO 8583: 1987. Likewise, when the first digit of the four-digit is 1, the version is ISO 8583: 1993 and when the first digit of the four-digit is 2, the version is ISO 8583: 2003.

FIG. 7C illustrates the fields associated with second digit of the MTI. As shown, the second digit can take the values 0 to 9. As can be seen in FIG. 7C, for the values 0 and 9, the MTI field is reserved for ISO. Likewise, FIG. 7D illustrates the fields associated with third digit of the MTI. As can be seen in FIG. 7C, for the values 8 and 9, the MTI field is reserved for ISO.

In an embodiment, the merchant system (104) can include a unique identifier in the transaction message indicating presence of the m-OTP in the transaction message. In one embodiment, the second digit among the four digit can indicate the presence of the m-OTP in the transaction message. For example, the value 0 in the second digit can be defined to indicate the m-OTP. In another example, the value 9 in the second digit can be defined to indicate the m-OTP.

In one embodiment, the third digit among the four digit can indicate the presence of the m-OTP in the transaction message. For example, the value 8 in the third digit can be defined to indicate the m-OTP. In another example, the value 9 in the third digit can be defined to indicate the m-OTP.

In one embodiment, for all values of the fourth digit, the field is defined. Hence, m-OTP may not be identified using the fourth digit. FIG. 7E illustrates the fields associated with fourth digit of the MTI.

In an embodiment, the unique identifier is the MTI four-digit code.

In an embodiment, a bitmap is a field indicating which data elements may be present or not in the transaction message. The transaction message includes at least one bitmap, called the primary bitmap which indicates which of data elements 1 to 64 are present. A secondary bitmap may also be present as data element one, and the secondary bitmap indicates which of data elements 65 to 128 are present. Also, a third bitmap can be used to indicate the presence or absence of fields 129 to 192. In an embodiment, the m-OTP can be accommodated either in first 1-64 bits of the data elements, or the 65 to 128 bits of the data elements. Accordingly, the primary bitmaps and secondary bitmaps can be updated to indicate the m-OTP in the transaction message. The value of the bitmap indicates whether the m-OTP is present in the 1-64 bits or 65-128 bits.

The data elements are all the fields that contain the transaction information. ISO8583:1997 contains up to 128 data elements (the message will have up to 2 bitmap fields). The later versions contain up to 192 data elements (the message will have up to 3 bitmaps fields). Each field (data element) has a specific meaning and format. In an embodiment, the data elements can also include the m-OTP. For example, the data fields 46, 47, 48, 55-63, 105-119 can be used. In another embodiment, the field 128 is used for message authentication code in conventional systems. In accordance with the present disclosure, the field 128 can be used for m-OTP.

In an embodiment, the merchant system (104) can include the PAReq message in the transaction message. In an alternate embodiment, the merchant system may not include the PAReq message in the transaction message.

Referring back to FIG. 5, at step (503), the merchant system (104) provides the transaction message as generated in step (502) to the acquirer system (105). In one embodiment, if the merchant system had included the PAReq message in the transaction message, the acquirer system (105) further includes the payment authorization request message in the transaction message. The acquirer system (105) submits the transaction message comprising the PAReq message and the payment authorization request message to the directory server (106). The directory server (106) is configured to send the transaction message to the ACS (203) for authentication and authorization. The ACS (203) receives the transaction message and initially validates the m-OTP. In an embodiment, the ACS (203) determines that the transaction message has to be authenticated using m-OTP based on the values in the MTI field. Further, the ACS (203) identifies the m-OTP using the bitmap values in the transaction message. Thereafter, the ACS (203) retrieves the m-OTP for authenticating. While validating the m-OTP, the ACS (203) generates an m-OTP locally in the issuer system (107) using the time data included in the transaction message. The algorithm used by the ACS (203) for generating the m-OTP should be same as the algorithm used by the issuer mobile application (301). If the generated m-OTP match the received m-OTP, the transaction message is successfully authenticated. If the generated m-OTP does not match the locally generated m-OTP, the authentication is failed. Upon successful authentication, the ACS (203) retrieves the transaction details from the transaction message and authorizes the transaction. In one embodiment, the transaction information comprises at least one of, a primary account number of the cardholder, a processing code, a transaction amount, a transaction date and time, an acquirer system identification code, a currency code, an issuer system identification code, and mode of authentication comprising m-OTP, One Time Password (OTP) generated by the issuer system, a static password and biometric pattern information. Authorization can be performed as performed in existing systems. Thereafter, the ACS (203) generates a Payment Authentication Response (PARes) message based on the authentication and authorization. The fields in the PARes can be based on success of authentication and authorization.

In an embodiment, the directory server (106) may be capable of identifying the m-OTP, retrieve the m-OTP and provide the m-OTP along with the transaction message to the ACS (203).

In an embodiment, the PARes message is provided to the directory server (106) which routes the PARes message to the acquirer system (105). The acquirer system (105) in turn transmits the PARes message to the merchant system (104).

At step (504), the merchant system (104) receives the PARes message from the acquirer system (105) and presents an appropriate message to the cardholder (101) on the merchant checkout page.

Figure 6:
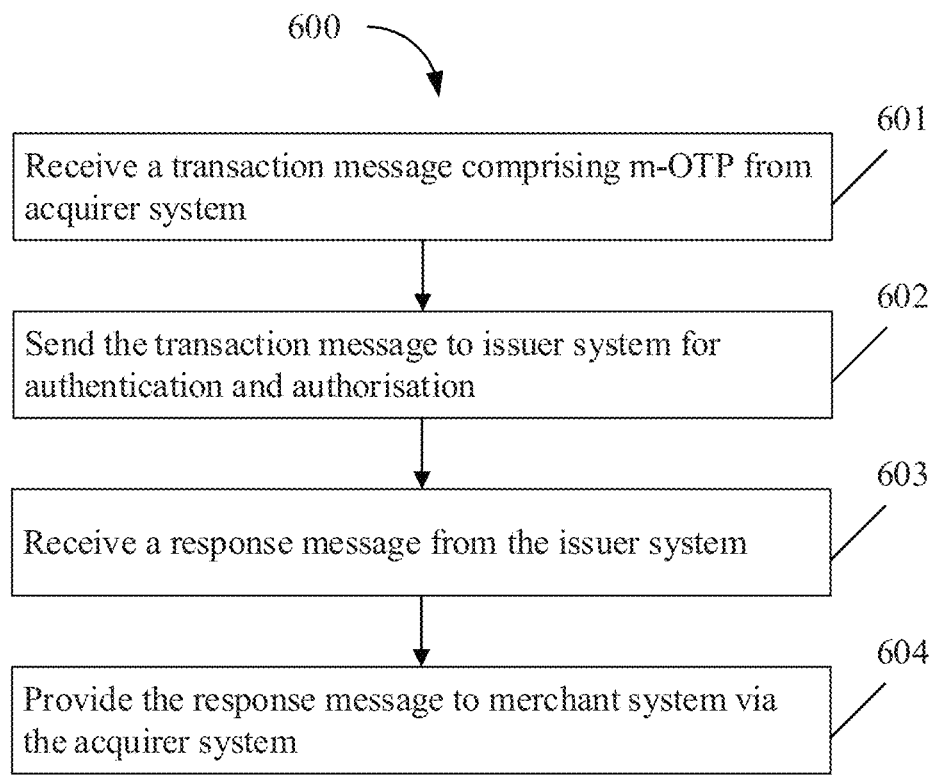
FIG. 6 is a flowchart describing m-OTP based payment authorization facilitated by directory server, in accordance with an embodiment of the present disclosure.

Reference is now made to FIG. 6. The following method describes the steps performed by the directory server (106). FIG. 6 is a flowchart describing m-OTP based payment authorization facilitated by directory server (106), in accordance with an embodiment of the present disclosure.

As illustrated in FIG. 6, the method 600 may comprise one or more steps. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

The following steps are performed after the merchant system (104) has generated the transaction message comprising the m-OTP and assuming the steps (501)-(503) are performed (until the transaction message is provided to the acquirer system (105)).

At step 601, the directory server (106) receives the transaction message comprising the m-OTP from the acquirer system (105). In an embodiment, the directory server (106) is capable of differentiating the transaction message comprising the m-OTP from other type of transaction messages not comprising the m-OTP using the identifier present in the transaction message. In one embodiment the received transaction message comprises only the PAReq message. In another embodiment, the transaction message comprises the PAReq message and the payment authorization request message.

At step 602, the directory server (106) sends the transaction message to the ACS (203) of the issuer system (107) for authentication and authorization depending of presence of PAReq message and payment authorization message. In one embodiment, the directory server (106) is capable of retrieving the m-OTP and time data from the transaction message and provide the m-OTP and the time data to the ACS (203) for authentication. Upon successful authentication, the directory server (106) can send the transaction message comprising the transaction details to the ACS (203) for authorization. In another embodiment, the directory server (106) can send the transaction message to the ACS (203) without retrieving the m-OTP. The ACS (203) can retrieve the m-OTP, authenticate and authorize the transaction. Upon authenticating and authorizing, the ACS (203) generates the PARes message as explained in step (503) of FIG. 5 and provide the PARes message to the directory server (106).

In an embodiment, to ensure seamless authentication, the directory server (106) can authenticate the transaction. In order for the directory server (106) to authenticate, the cardholder's device (103) should be configured with the interoperability domain mobile application capable of generating the m-OTP. After authenticating the m-OTP, the directory server (106) can send the transaction message to the ACS (203) for authorization.

At step 603, the directory server (106) receives the PARes message from the ACS (203). In one embodiment, the directory server (106) lodges the PARes result in a local ledger. The lodging of the PARes result in the local ledger can be used to determine success rate in m-OTP based transaction messages.

At step 604, the directory server (106) provides the PARes message to the merchant system (104) via the acquirer system (105). The merchant system (104) may provide the result of the PARes message to the cardholder (101) on the merchant checkout page.

Figure 8A:
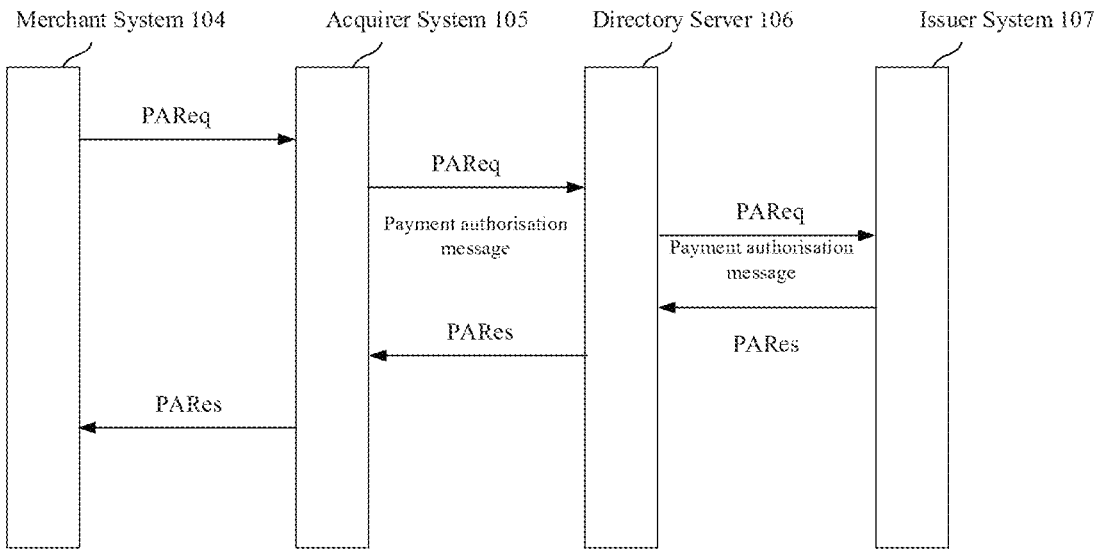
FIG. 8A illustrates an exemplary flow of m-OTP based messages sent during the payment transaction without 3D rails, in accordance with an embodiment of the present disclosure.

FIG. 8A illustrates flow of m-OTP based messages sent during the payment transaction without 3D rails, in accordance with an embodiment of the present disclosure. As shown, the merchant system (104) generates the transaction message comprising the m-OTP. The merchant system (104) further includes the PAReq message in the transaction message and transmits the transaction message comprising the PAReq message to the acquirer system (105). The acquirer system (105) receives the transaction message comprising the m-OTP and the PAReq message and appends the payment authorization request message in the transaction message. Further, the acquirer system (105) sends the transaction message comprising the PAReq message and the payment authorization request message to the directory server (106). The directory server (106) routes the transaction message comprising the PAReq message and the payment authorization request message to the issuer system (107).

In an embodiment, the issuer system (107) authenticates and based on the result of authentication, authorizes the transaction message. Based on the result of authorization, the issuer system (107) generates the PARes message comprising the result of authentication and authorization. The PARes message is provided to the directory server (106), which in turn routes the PARes message to the acquirer system (105). Further, the acquirer system (105) sends the PARes message to the merchant system (104) which displays an appropriate message on the merchant checkout page based on the result of authentication and authorization enclosed in the PARes message.

In an embodiment, this technique of m-OTB based transaction reduces one message in the platform (100). Therefore, processing of additional message is reduced as well as time is reduced. The complexity of managing the transactions is reduced for all entities (merchant system (104), acquirer system (105), directory server (106) and the issuer system (107)).

Figure 8B:
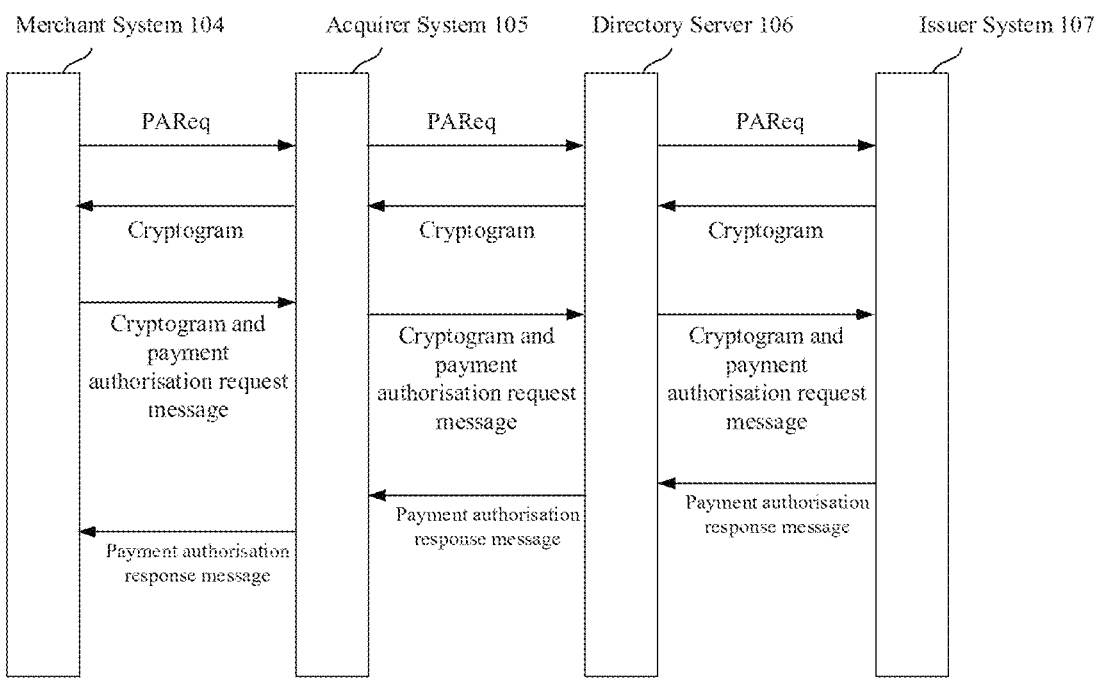
FIG. 8B illustrates an exemplary flow of m-OTP based messages sent during the payment transaction with 3D rails, in accordance with an embodiment of the present disclosure.

FIG. 8B illustrates flow of m-OTP based messages sent during the payment transaction with 3D rails, in accordance with an embodiment of the present disclosure. As shown, the merchant system (104) generates the transaction message comprising the m-OTP. The merchant system (104) further includes the PAReq message in the transaction message and transmits the transaction message comprising the PAReq message to the acquirer system (105). The acquirer system (105) receives the transaction message comprising the m-OTP and the PAReq message. Further, the acquirer system (105) sends the transaction message comprising the PAReq message to the directory server (106). The directory server (106) routes the transaction message comprising the PAReq message to the issuer system (107).

In an embodiment, the issuer system (107) authenticates the transaction message. Based on the result of authentication, the issuer system (107) generates a cryptogram indicating the result of authentication. In an embodiment, the issuer system (107) retains the transaction message. The cryptogram is provided to the directory server (106), which in turn routes the cryptogram to the merchant system (104) via the acquirer system (105). If the authentication is unsuccessful, the merchant system (104) displays an appropriate message on the merchant checkout page. If the authentication is successful, then the merchant system (104) generates the payment authorization request message. Further, the payment authorization request message along with the cryptogram is provided to the acquirer system (105). The acquirer system (105) routes the payment authorization request message along with the cryptogram to the issuer system (107) via the directory server (106). The issuer system (107) authorizes the transaction based on the transaction details retained by the issuer system (107) upon receiving the payment authorization request message along with the cryptogram. Further, the issuer system (107) generates a payment authorization response message comprising the result of authorization. The payment authorization request message is communicated to the merchant system (104) via the directory server (106) and the acquirer system (105). The merchant system (104) then displays an appropriate message on the merchant checkout page based on the result of authorization.

In an embodiment, the m-OTP based transactions increases security as the OTP is not shared over telecom network to the cardholder (101). Also, as the m-OTP is not dependent on the telecom network, the failure due to fault in telecom network does not affect the transaction. Further, time of completing the transaction is reduced as the m-OTP can be generated by the cardholder (101) and is not provided by the issuer system (107).

Figure 9:
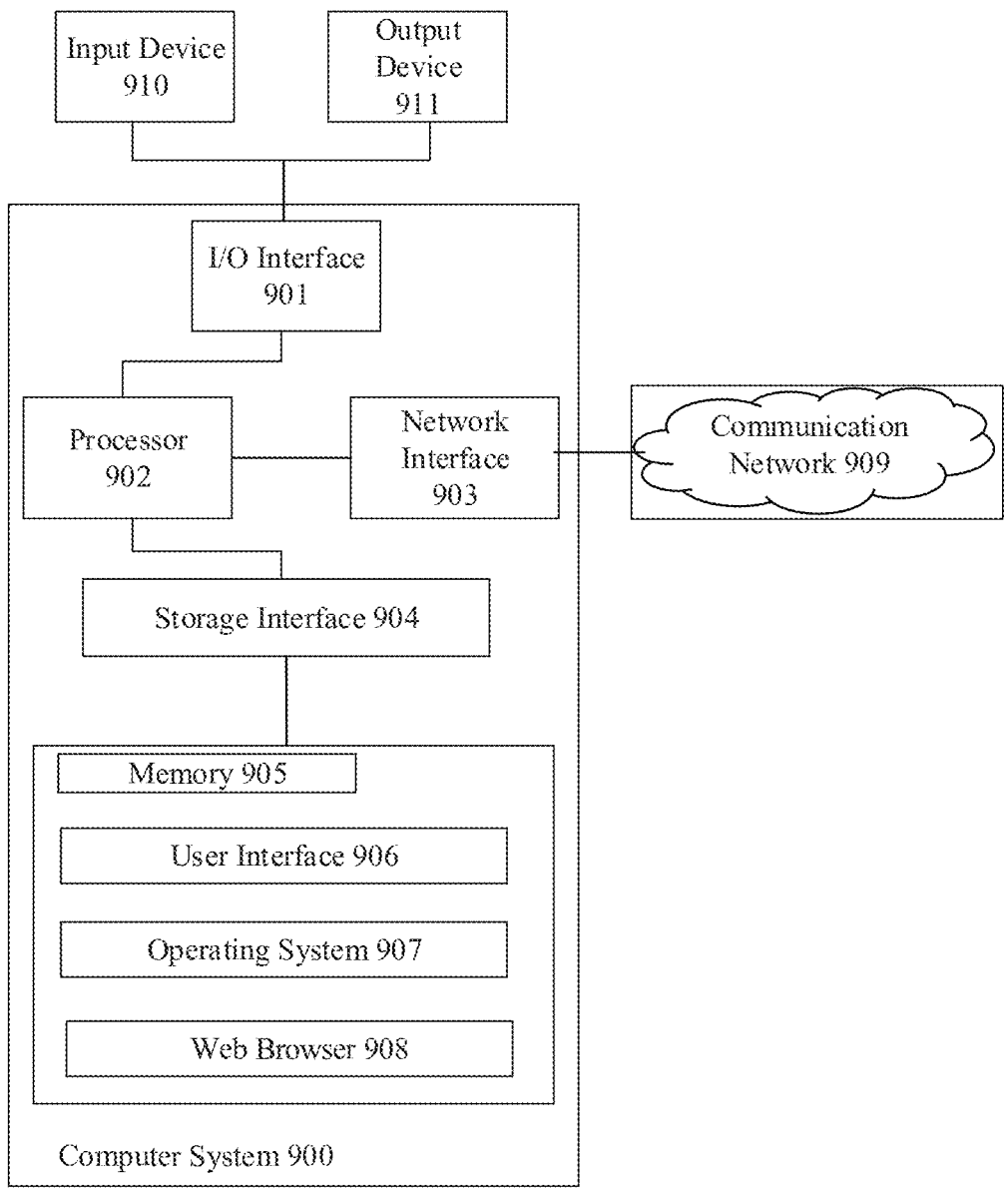
FIG. 9 illustrates a block diagram of an exemplary computer system (900) for implementing embodiments consistent with the present disclosure.

FIG. 9 illustrates a block diagram of an exemplary computer system (900) for implementing embodiments consistent with the present disclosure. In an embodiment, the computer system (900) is used to implement the method for authorizing transactions in the platform (100). The computer system (900) may comprise a central processing unit ("CPU" or "processor") (902). The processor (902) may comprise at least one data processor for executing program components for dynamic resource allocation at run time. The processor (902) may include specialized processing units such as integrated system (bus) controllers, memory management control units, floating point units, graphics processing units, digital signal processing units, etc.

The processor (902) may be disposed in communication with one or more input/output (I/O) devices (not shown) via I/O interface (901). The I/O interface (901) may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax®, or the like), etc.

Using the I/O interface (901), the computer system (900) may communicate with one or more I/O devices. For example, the input device (910) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (911) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (900) is connected to the service operator through a communication network (909). The processor (902) may be disposed in communication with the communication network (909) via a network interface (903). The network interface (903) may communicate with the communication network (909). The network interface (903) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (909) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (903) and the communication network (909), the computer system (900) may communicate with the one or more service operators.

In some embodiments, the processor (902) may be disposed in communication with a memory (905) (e.g., RAM, ROM, etc. not shown in FIG. 9) via a storage interface (904). The storage interface (904) may connect to memory (905) including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (905) may store a collection of program or database components, including, without limitation, user interface (906), an operating system (907), web server (908) etc. In some embodiments, computer system (900) may store user/application data, such as the data, variables, records, etc. as described in this disclosure. Such databases may be implemented as fault-tolerant, relational, scalable, secure databases such as Oracle or Sybase.

The operating system (907) may facilitate resource management and operation of the computer system (900). Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system (900) may implement a web browser (908) stored program component. The web browser (908) may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers (908) may utilize facilities such as AJAX, DHTML, Adobe Flash, JavaScript, Java, Application Programming Interfaces (APIs), etc. In some embodiments, the computer system (900) may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system (900) may implement a mail client stored program component. The mail client may be a mail viewing application, such as Apple Mail, Microsoft Entourage, Microsoft Outlook, Mozilla Thunderbird, etc.

In an embodiment, the computer system (900) is a directory server providing services for facilitating transactions between a merchant associated with an acquirer system, and an issuer system. In an embodiment, the computer system (900) is connected to the entities comprising the merchant, acquirer system, issuer system.

The terms "an embodiment", "embodiment", "embodiments", "the embodiment", "the embodiments", "one or more embodiments", "some embodiments", and "one embodiment" mean "one or more (but not all) embodiments of the disclosure" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5, FIG. 6, show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
   generating a mobile-One Time Password (m-OTP) with a mobile application configured on a cardholder's device without using a network connection, the m-OTP generated based on at least one algorithm;
   receiving, by an acquirer system, a transaction message from a merchant system, the transaction message comprising the m-OTP, transaction information for authorization, and an identifier differentiating the transaction message from other types of transaction messages not including the m-OTP;
   transmitting, by the acquirer system, the transaction message to a directory server, the transaction message comprising the m-OTP and the transaction information for authorization;
   receiving, by the directory server, the transaction message comprising the transaction information for authorization, from the acquirer system, wherein the transaction message comprises at least the m-OTP, wherein the m-OTP was submitted into the merchant system, and wherein the merchant system provided the transaction message to the acquirer system for completing a transaction;
   differentiating, by the directory server, the transaction message from a plurality of transaction messages based on the identifier;
   after differentiating the transaction message from the plurality of transaction messages, transmitting, by the directory server, the transaction message to an issuer system;
   authenticating, by the issuer system, the cardholder based on the m-OTP retrieved from the transaction message and a second m-OTP generated by the issuer system using the at least one algorithm, wherein the mobile application is an issuer mobile application associated with the issuer system;
   authorizing, by the issuer system, the transaction in response to authenticating the cardholder by matching the m-OTP generated by the mobile application and the second m-OTP generated by the issuer system using the at least one algorithm;
   receiving, by the directory server, a response message comprising a result of authorization of the transaction message from the issuer system, the response message configured to display a message on a merchant checkout page hosted by the merchant system; and
   providing, by the directory server, the response message to the merchant system via the acquirer system.

2. The method as claimed in claim 1, wherein the identifier is inserted in one of a Message Type Identifier (MTI), a bitmap, or data elements of the transaction message.

3. The method as claimed in claim 1, wherein the m-OTP is a time-based password.

4. The method as claimed in claim 1, wherein the transaction message is formatted according to ISO8583 standard.

5. The method as claimed in claim 1, wherein the transaction information comprises at least one of a primary account number of the cardholder, a processing code, a transaction amount, a transaction date and time, an acquirer system identification code, a currency code, an issuer system identification code, a mode of authentication comprising the m-OTP, generated by the issuer system, a static password, and biometric pattern information.

6. The method as claimed in claim 1, wherein the response message is generated based on authenticating the m-OTP and authorizing the transaction message.

7. The method as claimed in claim 1, wherein the transaction message includes a payer authentication request (PAReq) message.

8. A computer program product for authorizing transactions, the computer program product comprising at least one non-transitory computer-readable medium including one or more instructions that when executed by at least one processor, causes the at least one processor to:
   generate a mobile-One Time Password (m-OTP) with a mobile application configured on a cardholder's device without using a network connection, the m-OTP generated based on at least one algorithm;
   receive, by an acquirer system, a transaction message from a merchant system, the transaction message comprising transaction information for authorization the m-OTP, and an identifier differentiating the transaction message from other types of transaction messages not including the m-OTP;
   transmit, by the acquirer system, the transaction message to a directory server, the transaction message comprising the m-OTP and the transaction information for authorization;
   receive, by the directory server, the transaction message comprising the transaction information for authorization, from the acquirer system, wherein the transaction message comprises at least the m-OTP, and wherein the merchant system provided the transaction message to the acquirer system for completing a transaction;
   differentiate, by the directory server, the transaction message from a plurality of transaction messages based on the identifier;
   after differentiating the transaction message from the plurality of transaction messages, transmit, by the directory server, the transaction message to an issuer system;
   authenticate, by the issuer system, the cardholder based on the m-OTP retrieved from the transaction message and a second m-OTP generated by the issuer system using the at least one algorithm, wherein the mobile application is an issuer mobile application associated with the issuer system;
   authorize, by the issuer system, the transaction in response to authenticating the cardholder by matching the m-OTP generated by the mobile application and the second m-OTP generated by the issuer system using the at least one algorithm;
   receive, by the directory server, a response message comprising a result of authorization of the transaction message from the issuer system, the response message configured to display a message on a merchant checkout page hosted by the merchant system; and
   provide, by the directory server, the response message to the merchant system via the acquirer system.

9. The directory server as claimed in claim 8, wherein the at least one processor is configured to send the transaction message to the issuer system formatted according to ISO8583.

10. The directory server as claimed in claim 8, wherein the at least one processor receives the transaction message comprising the identifier inserted in one of a Message Type Identifier (MTI), a bitmap, or data elements.

11. The directory server as claimed in claim 8, wherein the at least one processor receives the response message generated based on authenticating the m-OTP and authorizing the transaction message.

12. The directory server as claimed in claim 8, wherein the transaction message includes a payer authentication request (PAReq) message.

* * * * *